United States Patent [19]
Barikosky et al.

[11] Patent Number: 5,346,347
[45] Date of Patent: Sep. 13, 1994

[54] REMOVABLE FASTENER CAPABLE OF ELASTIC DEFORMATION

[75] Inventors: Michel Barikosky; Christian Girardiere, both of Paris, France

[73] Assignee: Clipp-Off, Nanterre, France

[21] Appl. No.: 4,897

[22] Filed: Jan. 21, 1993

[30] Foreign Application Priority Data

Jan. 24, 1992 [FR] France .................. 92 00750

[51] Int. Cl.⁵ .................. F16B 13/04; F16B 37/04
[52] U.S. Cl. .................. 411/19; 411/21; 411/182; 411/508
[58] Field of Search .................. 411/19, 21–23, 411/15, 182, 508–510, 908, 913

[56] References Cited

U.S. PATENT DOCUMENTS

| | | |
|---|---|---|
| 2,324,520 | 7/1943 | Lamson .................. 411/19 X |
| 3,040,393 | 6/1962 | Dailey .................. 411/19 X |
| 3,169,439 | 2/1965 | Rapata . | 
| 3,469,493 | 9/1969 | Fisher .................. 411/913 X |
| 4,114,509 | 9/1978 | Poe . |
| 4,136,599 | 1/1979 | Hammer, Jr. .................. 411/913 X |
| 4,948,314 | 8/1990 | Kurosaki .................. 411/15 X |

FOREIGN PATENT DOCUMENTS 1284161 11/1968 Fed. Rep. of Germany .
3008990 9/1980 Fed. Rep. of Germany .

Primary Examiner—Neill R. Wilson
Attorney, Agent, or Firm—Lowe, Price, LeBlanc & Becker

[57] ABSTRACT

A parts fastener has a body having at one of its ends a flanged head projecting from the body. For that purpose the body evinces a central cavity communicating with the outside and includes at least a wall portion of which the inner side bounds part of the cavity, and which elastically deforms under an external force applied to the wall portion. The wall portion has, on its outer side, a projection which together with the head flange bounds a jaw by means of which the fastener may be inserted into the part to which it must be affixed. The projection opens on account of the deformation of the wall portion and frees the part and the fastener from each other. The device may also include means to cause the deforming force from the outside.

9 Claims, 3 Drawing Sheets

REMOVABLE FASTENER CAPABLE OF ELASTIC DEFORMATION

BACKGROUND OF INVENTION

1. Field of Invention

The present invention concerns a fastener affixed to a part with a through-hole to ensure assembly to at least another part.

2. Description of Related Art

Such fasteners for instance are rivets, screws and bolts. However, these fasteners incur drawbacks, in particular some, such as rivets, cannot be disassembled, or only with difficulty, and others, such as screws and bolts, require a plurality of distinct components.

The object of the invention is a fastener of this kind but free of those drawbacks, that is which shall be easily assembled and disassembled without requiring delicate handling.

SUMMARY OF INVENTION

The new fastener of this type comprises a body with a flanged head projecting form one end of said body which evinces a central cavity communicating with the outside, said body evincing at least one wall portion of which the inner side bounds said cavity and which will deform elastically when subjected to an external force applied to said inner side, said wall portion having on its outer side a projection which together with said flanged head bounds a jaw by means of which said fastener can engage said part and which by the deformation of said wall portion opens and releases the part from the fastener, further means from a pressure or vacuum source able to communicate with said cavity which is sealed in order to apply said deformation force from the outside.

The cavity can be sealed by a sliding material-on-material adjustment of the projection against its adjacent walls or by adding peripheral seals between the projection and its adjacent walls or by an elastic membrane integrated into said components at manufacture.

BRIEF DESCRIPTION OF DRAWINGS

In an illustrative and non-restrictive manner, the attached drawings show a number of embodiment modes of the invention.

DESCRIPTION OF PREFERRED EMBODIMENTS

Figure 1:
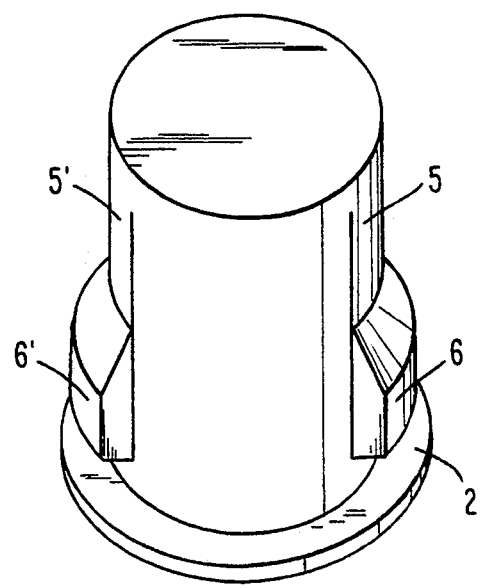
FIG. 1 is a perspective of an embodiment mode of the fastener of the invention at rest, that is, before deforming the portions which shall project.
Figure 2:
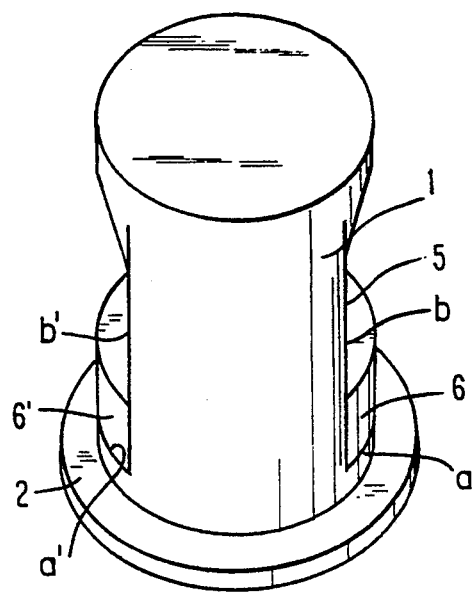
FIG. 2 is a view of the fastener of FIG. 1 after it was worked on, that is, after deformation.
Figure 3:
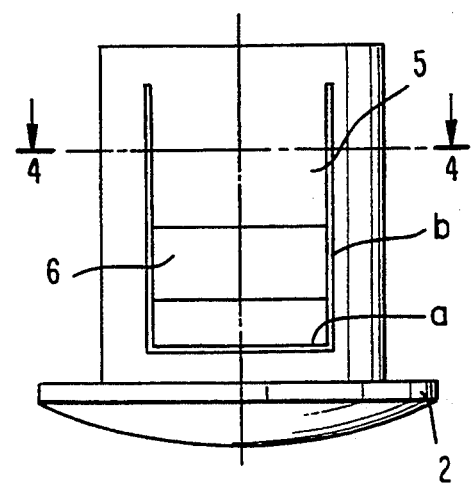
FIG. 3 is a sideview of the fastener of FIG. 1.
Figure 4:
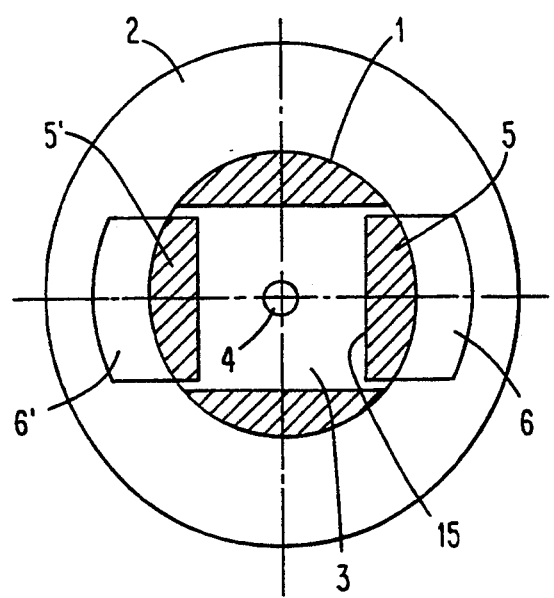
FIG. 4 is a topview of the fastener of FIG. 1 shown in section along 4—4 of FIG. 3.

In the embodiment mode shown in FIGS. 1 through 4, the fastener consists of a rigid cylindrical body 1 comprising an annular flanged head 2 projecting from the body 1.

A cavity 3 is present inside the body 1 and communicates with the outside through a central orifice 4. Two diametrically opposite wall portions 5,5' each evince at their lower part a projection 6,6' which is axially plumb with the fastener's flanged head.

These two wall portions 5,5' are elastically deforming and tip into the body when external forces are applied toward the cavity 3. In this instance the forces are due to a vacuum generated in the cavity 3 by an external pump communicating with this cavity through the orifice 4.

Seals a,a', b,b' are inserted between the peripheral contact surfaces of the projection and adjacent body walls.

Figure 5:
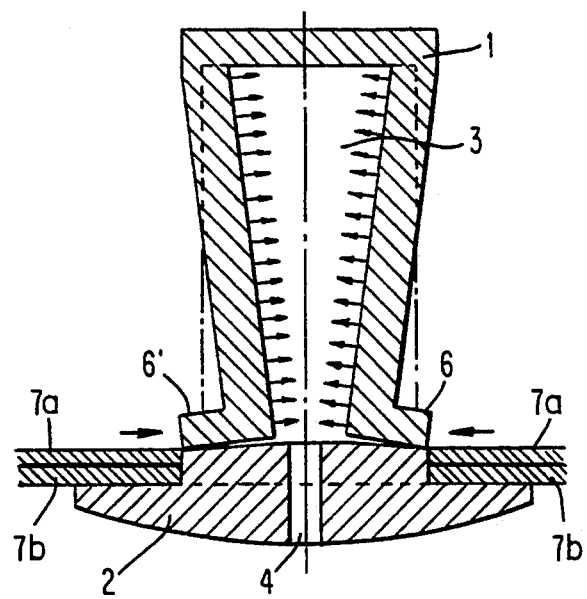
FIG. 5 is an axial section of the fastener of FIG. 1 when being affixed to a piece by vacuum deformation.

FIG. 5 illustrates how the fastener of FIGS. 1 through 4 is installed in a part 7 consisting of two contacting plates 7a, 7b comprising a circular aperture 8 with a diameter substantially equal to that of the fastener body 1.

The vacuum in the cavity 3 generates a pressure differential between atmospheric pressure and the pressure in said cavity and causes the projections 6,6' to bend inward so that they no longer project beyond the body. Thereupon the body 1 can slip through the aperture 8 and the edge 2 of the head to be applied against the inner side of the double part 7a, 7b.

Taking off the vacuum, that is applying atmospheric pressure to the cavity 3 causes instant elastic return of the projections 6,6' into their initial positions, in which they ar spread apart, and hence plumb with the flange 2.

Thereupon the two plates 7a, 7b of the part 7 are clamped between the flange 2 and the projections 6,6'.

Figure 6:
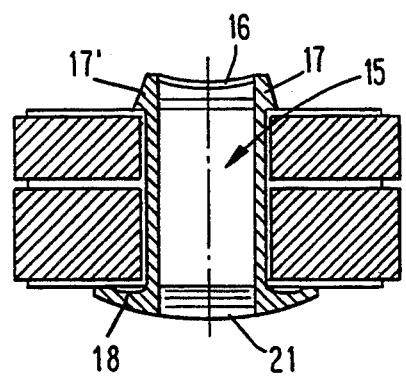
FIG. 6 is a section of another embodiment of the fastener of the invention.
Figure 7:
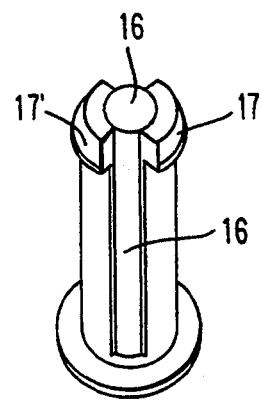
FIG. 7 is a perspective of the fastener of FIG. 6 showing its shape after installation.
Figure 8:
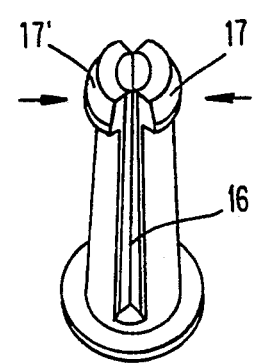
FIG. 8 shows the fastener of FIG. 6 before it is installed in the holes of the parts to be assembled.

In the embodiment mode of FIGS. 6 through 8, the cavity is an axial passage 15 through the body and bounded partly by an elastically deforming wall 16 that was manufactured to be integral with this body, and the projections 17, 17' are located at the upper level of the body, opposite the head 18. The flanged head and/or upper portion threads 21 act as a nut for a male threaded fastener 22 as shown in FIG. 9.

Figure 9:
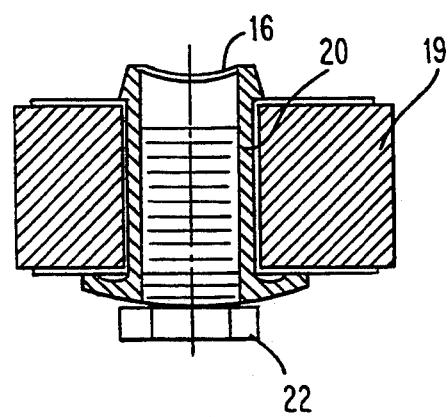
FIG. 9 is a section of the fastener of FIG. 6 when used as a closure means.

The device shown in FIG. 9 is identical with that of FIG. 6, however, it is used as the closure means for the orifice 20 of a receptacle 19.

The device of the invention is installed by inserting its body into the hole in the part until the flanged head comes to rest against one side of this part. In that case assembly and disassembly ar carried out by applying the deforming force of which the source in particular will be located on the same side as the flanged head.

Accordingly the fastener or device of the invention can be used "blindly", in other words, even when access is restricted to only one side of the part.

Again a fastener or device of the invention affixed to parts which must be assembled may also be associated with another fastener or device of the same kind that, being inserted into the previous one, shall thus lock it.

What is claimed is:

1. A fastener for a part, from which it can be removed again, comprising a body a flanged head projecting from one end of said body;

a central cavity within said body and communicating with outside of the body;

at least one wall portion of said body having an inner side bounding a segment of said cavity, wherein said wall portion elastically deforms when an outside force is applied to said wall portion;

a projection on an outer side of said wall portion, wherein said projection and said flanged head bound a jaw by means of which the fastener can be affixed to said part and on account of the deformation of said wall portion the projection will open and release the part and the fastener from each other; and means for applying said deforming force, wherein the deforming-force means are pressure or vacuum sources, the cavity is substantially sealed and said pressure or vacuum sources communicate with said central cavity to create a pressure imbalance causing said outside force.

2. Fastener according to claim 1, wherein the cavity is sealed by a material-on-material sliding motion of the projection against adjacent walls of said body.

3. Fastener according to claim 1, wherein the cavity is sealed by inserting peripheral seals between the projection and adjacent walls of said body.

4. Fastener according to claim 1, wherein the cavity is sealed by an elastic membrane integrated during manufacture into the other components.

5. Fastener according to claim 1, characterized in that it serves as a closure means for a receptacle orifice.

6. Fastener according to claim 1, wherein the cavity is a continuous axial passage through the body of which the head or upper part is threaded to act as a nut for a threaded part.

7. Fastener according to claim 1, inserted into said part in order to lock it.

8. Fastener according to claim 1, wherein said outside force is atmospheric pressure.

9. A fastener adapted to be inserted through a hole defined within an object to be fastened and from which it can be removed, comprising:

a body having an axis, a lateral wall parallel with said axis and a substantially air-tight central cavity;

a flanged head at one end of said body having a hole through which said cavity communicates with outside said body and a first annular substantially plane surface perpendicular to said axis; and a least one wall portion having an inner side bounding a segment of said cavity and an outer side along the lateral wall of the body with a second substantially plane annular surface, wherein said wall portion is resiliently movable, from (i) a first position in which said second annular surface is parallel to and faces said first annular surface, to (ii) a second position when said cavity is connected to an external vacuum source, in which said second annular surface is moved toward the axis of the body so as to be no longer parallel with said first annular surface;

wherein, said first and second annular surfaces bound between them an operable jaw by means of which the fastener, after having been inserted in said hole when said movable wall portion is in said second position, can be fastened to said object when said movable wall portion is brought to said first position.

* * * * *